Figure 1B:
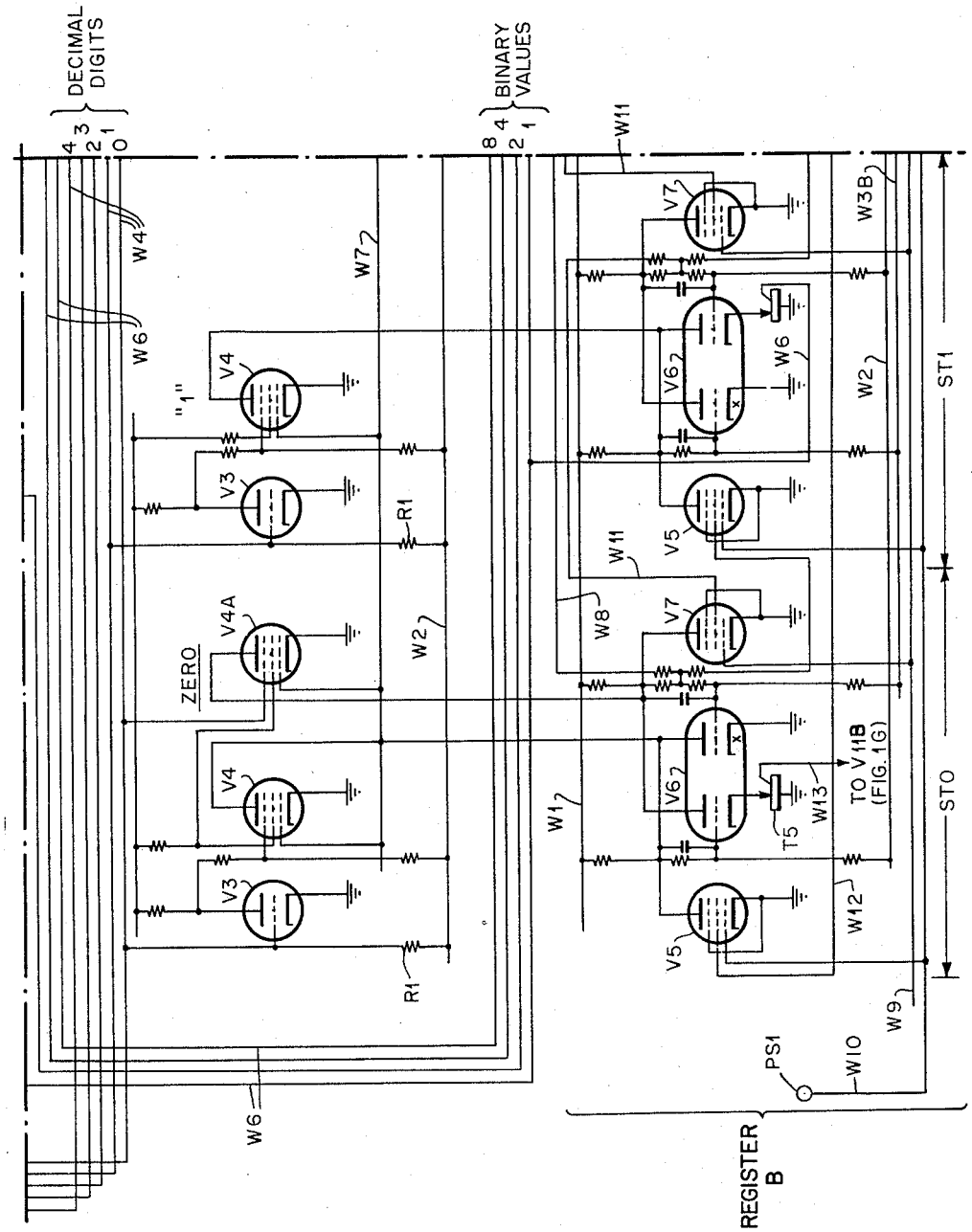

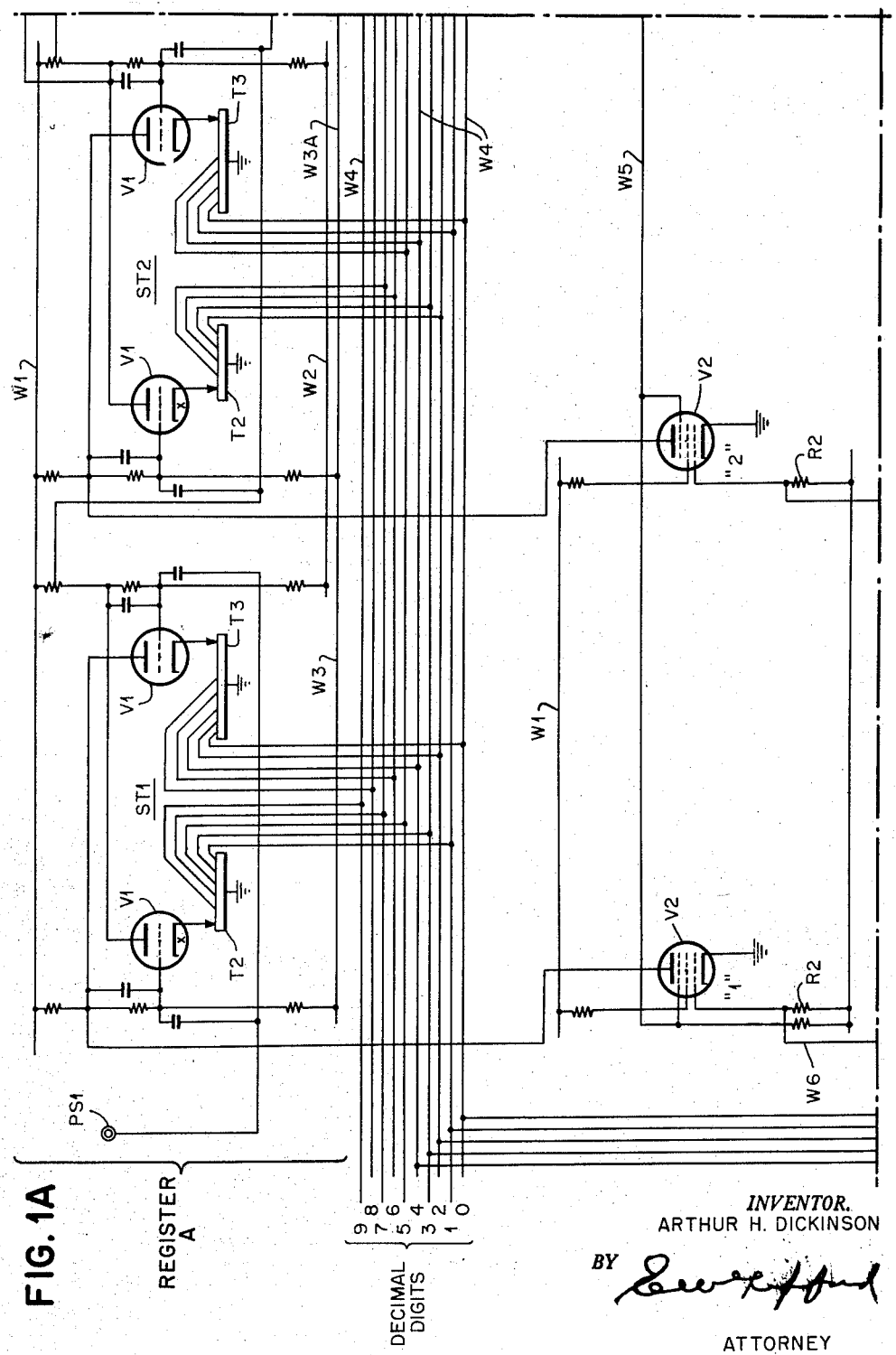

INVENTOR.
ARTHUR H. DICKINSON

ATTORNEY

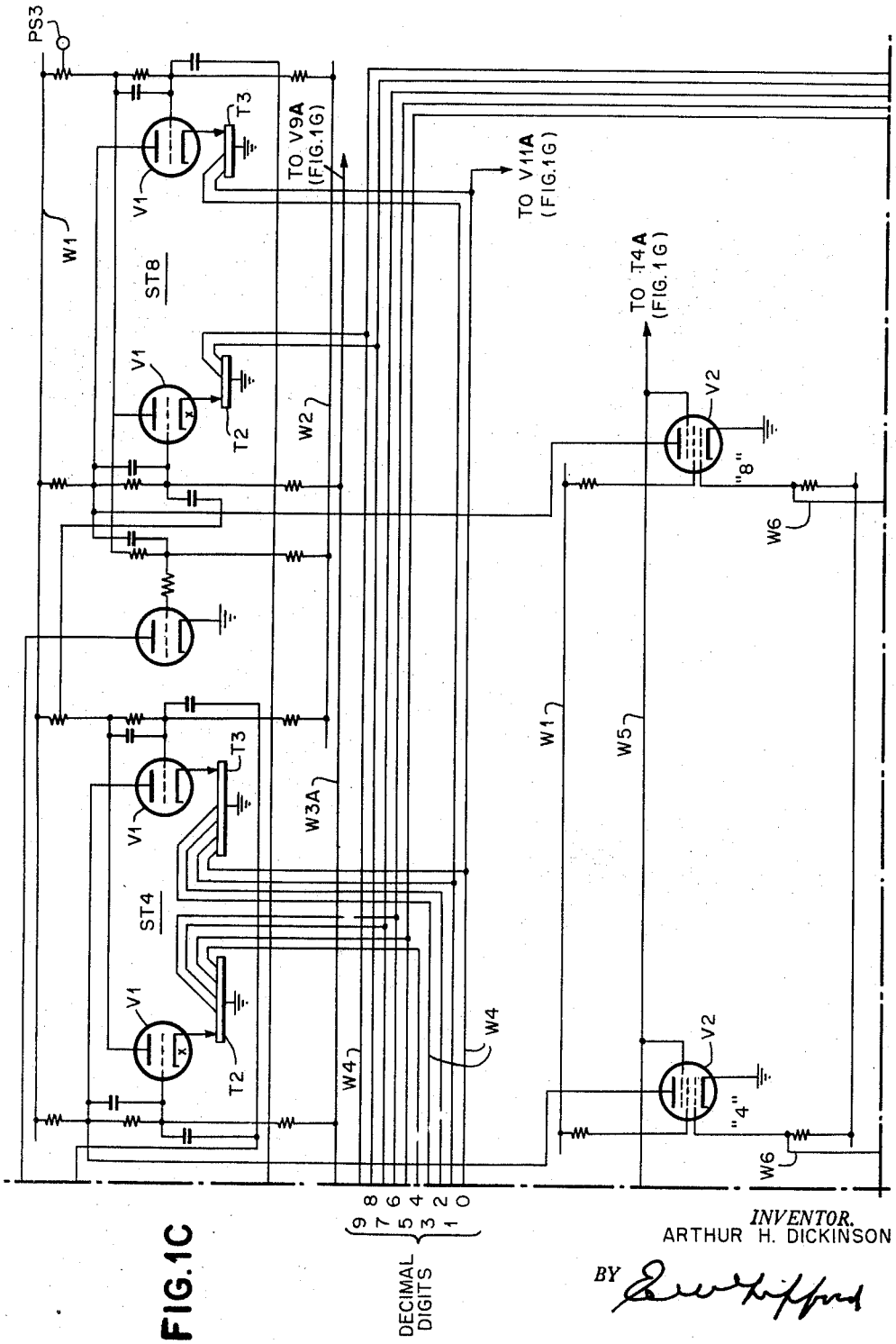

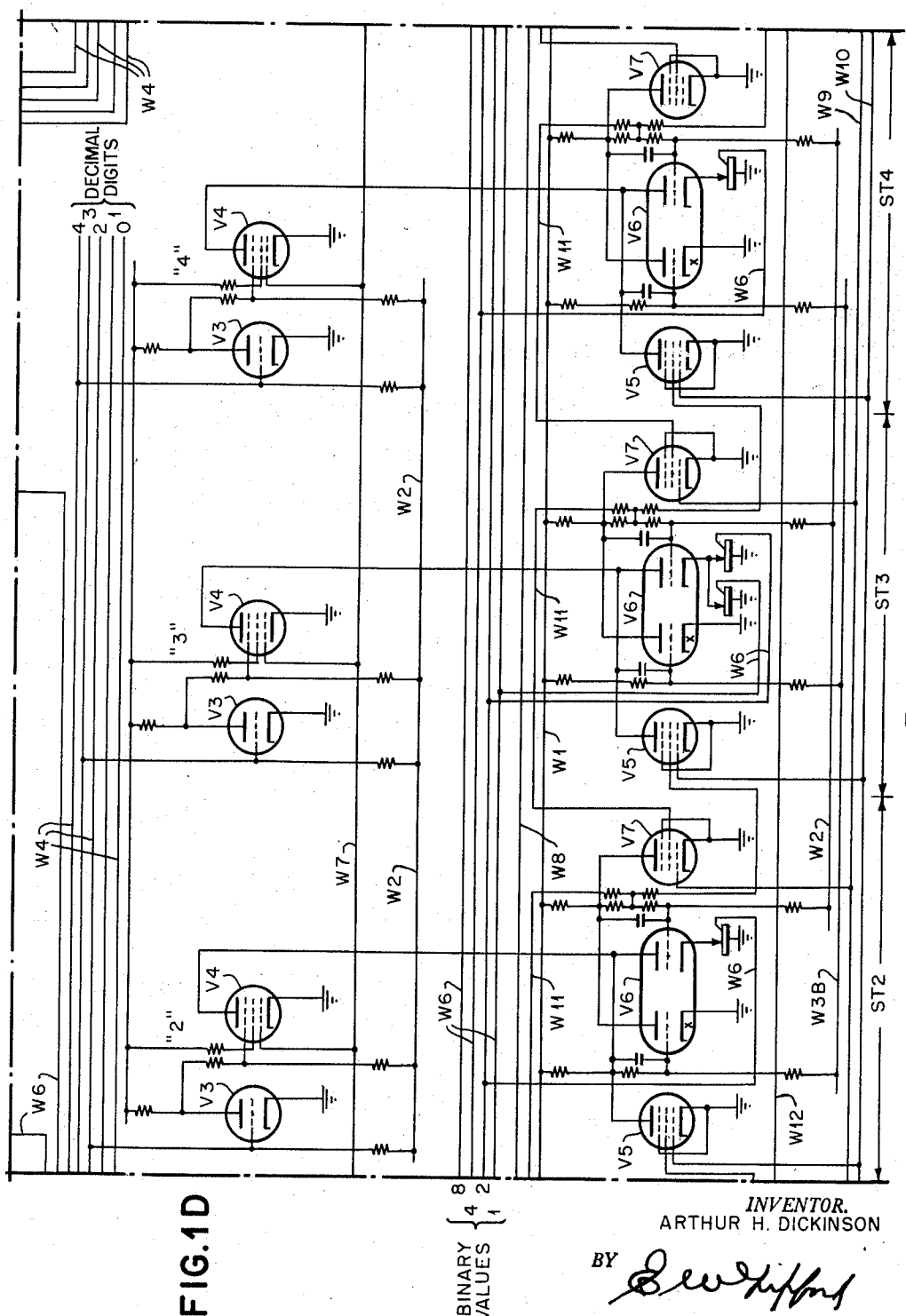

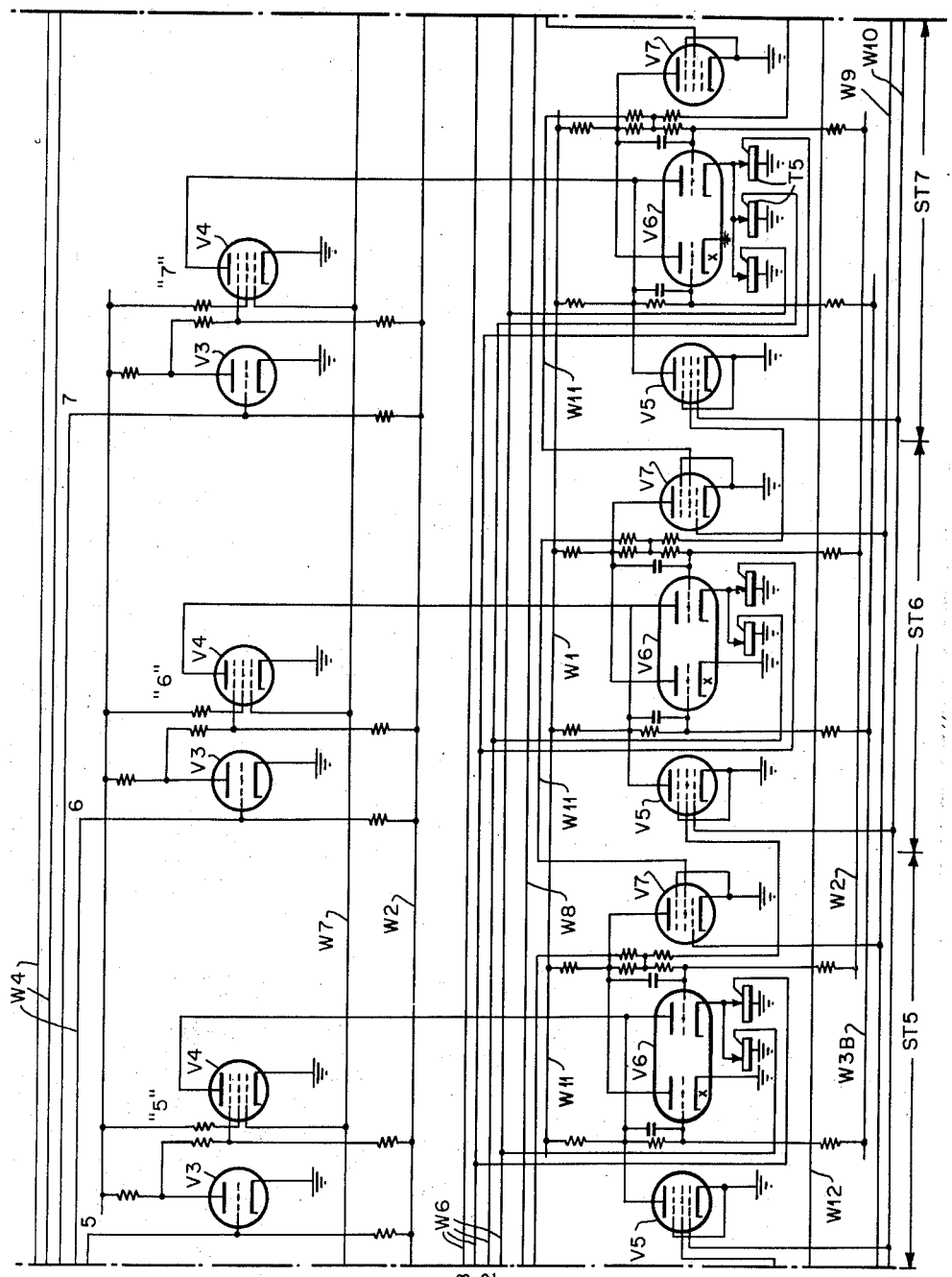

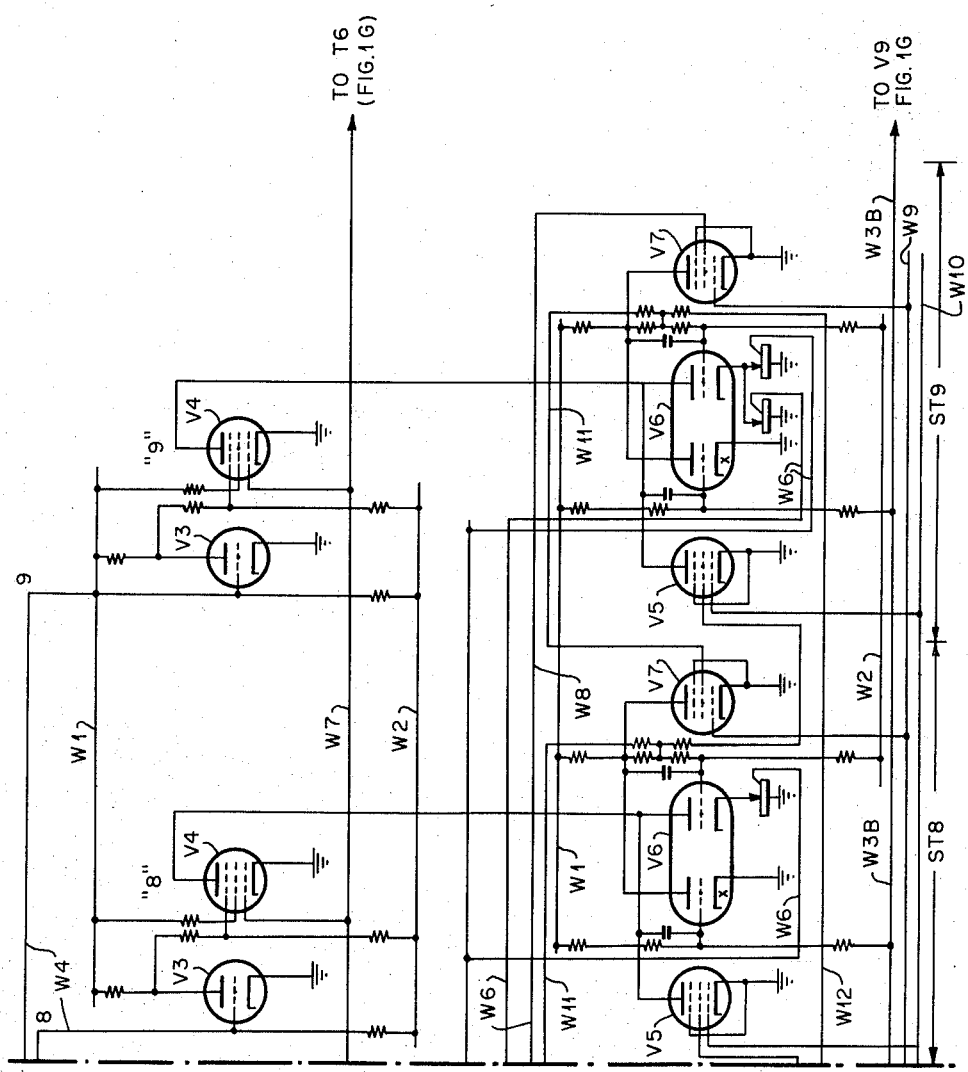

*INVENTOR.*
ARTHUR H. DICKINSON
ATTORNEY

March 1, 1960 A. H. DICKINSON 2,927,313
DATA PROCESSING MACHINE
Filed Dec. 31, 1954 8 Sheets-Sheet 8

INVENTOR.
ARTHUR H. DICKINSON
BY
ATTORNEY ns Patent Office 2,927,313
Patented Mar. 1, 1960

2,927,313

DATA PROCESSING MACHINE

Arthur H. Dickinson, Greenwich, Conn., assignor to International Business Machines Corporation, New York, N.Y., a corporation of New York Application December 31, 1954, Serial No. 479,200

16 Claims. (Cl. 340—347)

This invention relates to data processing machines and more particularly to means for effecting the transfer of data in connection with its processing.

The principal object of the invention is to provide means for transferring data which may exist in one form of representation to a register in which it will be retained in a different form of representation.

An object is to provide a bilateral data transferring system in which data may be transferred in either direction from the register or storage device in which it is retained in one form of representation to a register or storage device in which the data is to be retained in a different form of representation.

An object of the invention is to provide a data transferring system in which the transfers are effected electronically and substantially instantly from one register or storage device to another.

A specific object is to provide a means of transferring data from a binary register or storage device to a digital or decimal register in which each digit is represented by a separate and distinct element.

An object is to provide a bilateral data transferring system in which a single pulse applied to the transfer network initially effects the restoration of the register or storage device which is to receive the data and thereafter also effects the transfer.

An object is to provide a system whereby the initial transfer pulse is suppressed in so far as its ultimate transfer effect is concerned if the register or storage device receiving the data fails to reset.

An object is to provide an electronic data transfer circuit suitable for use with electronic registers or storage devices in which an initial transfer control pulse causes the resetting of the register that is about to receive the data, tests the register for clearance, and finally permits the transfer pulse to take full effect only when the receiving register is clear of data.

An object of the invention is to provide a data transferring circuit having the foregoing characteristics in which semi-conductors are used.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1A to 1G comprise a wiring diagram.

Figure 1G:
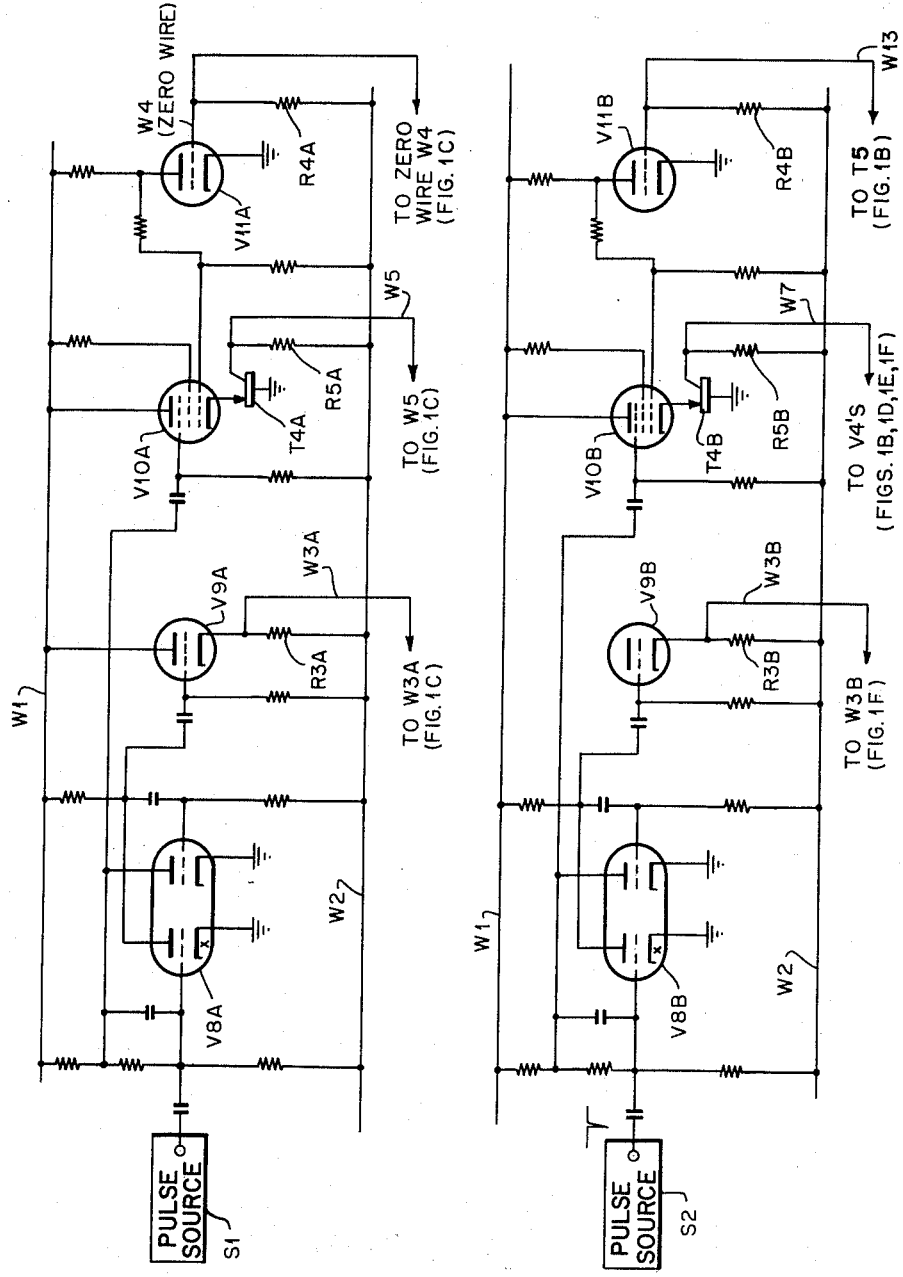
Figure 2:
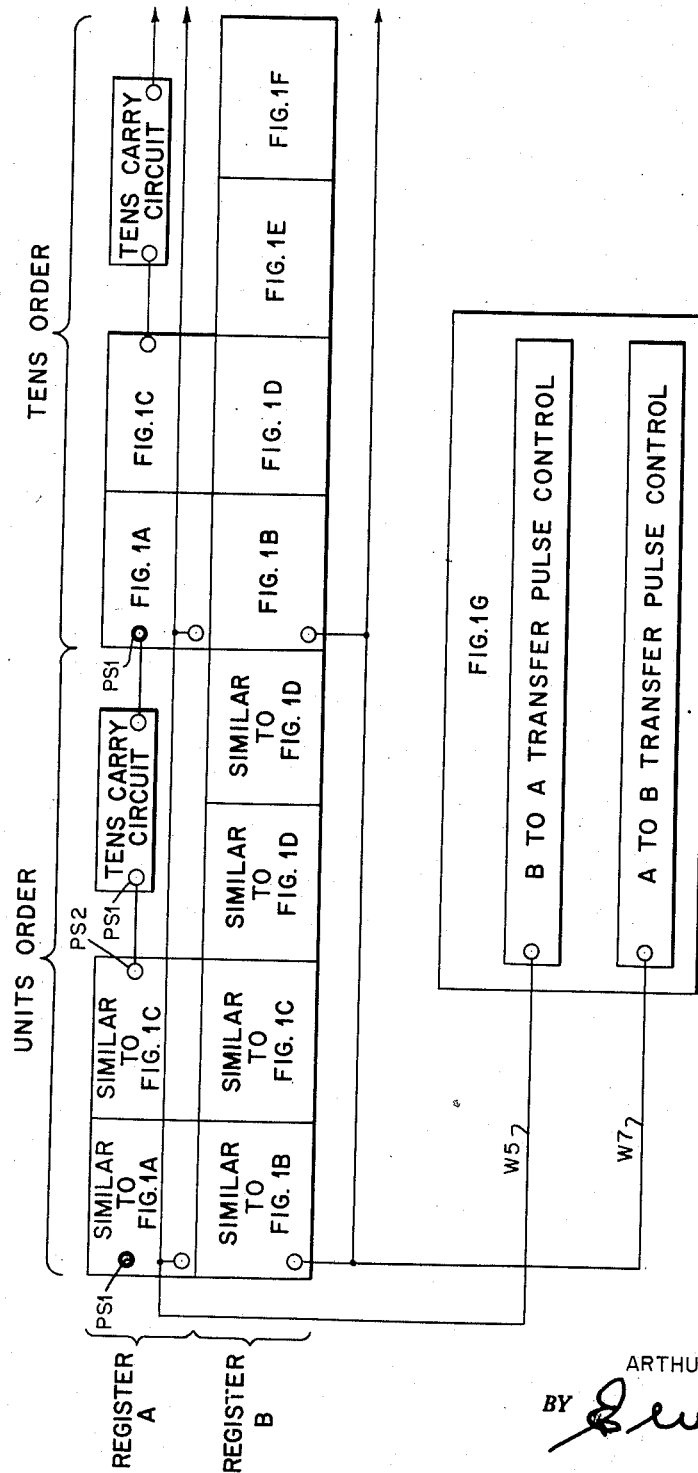

Fig. 2 is a figure illustrating how Figures 1A to 1G are assembled to form a complete wiring diagram and also indicates in block form how a plurality of register or storage orders may be assembled to form a complete register or storage device.

For the purpose of illustrating the invention there have been shown in the drawings two different types of conventional electronic register or storage device. In Figs. 1A and 1C there is shown a single order of a binary register or storage device composed of Eccles-Jordan triggers substantially similar to the ones disclosed in Patent 2,584,811, while in Figs. 1B and 1D to 1F there is disclosed a single order of a direct digital representation or decimal type of register similar to the one disclosed in Patent 2,580,741 in which the individual orders comprise trigger type ring circuits in which the status of some one individual trigger represents a single digit. However, since the data transfer circuits are controlled primarily by differences of potentials which indicate digital values or binary bit values, it will be understood that other types of register or storage device may be used without substantial change in the circuits.

Since the binary register disclosed in Figs. 1A and 1C is well known in the art it will not be described in detail. It comprises four stages, digits ST1, ST2, ST4, ST8 in which the suffixes indicate the binary bit values "1," "2," "4," "8." The values are represented in the register by the "On" status of the trigger. The "Off" status of the triggers is indicated in the drawings by a small letter "x" placed underneath the cathodes of the tubes V1 comprising the triggers. This same method of designation will be employed in connection with every trigger circuit to indicate the condition to which the trigger would normally be reset as a preliminary to the commencement of operations in the data processing machine in which the invention might be used.

The register disclosed in Figs. 1B and 1D to 1F is substantially identical with the one disclosed in Patent 2,580,741 but will be very briefly described because the circuit of the patent has been modified slightly to provide separate pentode gates instead of combining each trigger triode with a pentode gate in a single tube.

In Figs. 1B and 1D to 1F the digital stages of register B are designated ST0 to ST9 and form a ring circuit which initially is reset so that the right hand triode V6 of stage ST0 is conductive or "On" to designate zero. Under these conditions the left hand triodes of the remaining tubes V6 for stages ST1 to ST9 are conductive in "Off" status. Entry pulses may be applied to the plug socket PS1 (Fig. 1B) and will be injected in the control grids of the gate tubes V5 by means of wire W10. Since trigger V6 for stage ST9 (Fig. 1F) is conductive on the left hand side, the left hand gate V5 (Fig. 1B) is prevented from conducting due to low screen potential. The grid of the right hand triode V6 for stage ST0 is at high potential, thereby priming the right hand gate V5 for conduction at the screen grid. The remaining stages ST2 to ST9 are all conductive in "Off" status on the left hand side, consequently none of the other gates V5 are primed for conduction.

Thus the first entry pulse appearing on wire W10 causes the gate V5 for stage ST1 to conduct. This produces a negative pulse which shifts the trigger V6 for stage ST1 to "On" status with its right hand triode conducting. The change of status of the trigger for stage ST1 produces a positive pulse on wire W11 which primes the gate V7 for stage ST0 for conduction at the screen grid. Regularly timed impulses appear on wire W9 and are timed to occur between the pulses on wire W10. Immediately after the placing of stage ST1 in "On" status, a pulse on wire W9 causes gate V7 to conduct and this drives the right hand grid of tube V6 for stage ST0 below cutoff and renders tube V6 conductive on the left hand side. If now, a second pulse appears on wire W10, the gate V5 (Fig. 1D) associated with stage ST2 will conduct and shift trigger V6 for stage ST2 to "On" status and stage ST1 to "Off" status in the same manner as for stages ST1, ST0. Thus the series of triggers comprising the stages ST0 to ST9, will be progressively changed to "On" status from left to right in Figs. 1B and 1D to 1F according to the number of pulses appearing on wire W10 and the effect will be accumulative according to the number of pulses previously applied to the plug socket PS1. The entry pulses appearing on wire W10 may be produced by any well-known means such as the read-in triggers and gates commonly used in the art for digitally impulsing registers.

It will be understood that register B comprises plurality of denominational orders each of which consists of a series of stages ST0 to ST9 wired in accordance with Figs. 1B and 1D to 1F. In Fig. 2 there is illustrated in block diagram form a simple register comparing two orders which may consist of simple storage devices or suitable tens carry circuits of well known form may be provided to enable the orders to function either as a counter or as an accumulator.

Register A, likewise may consist of a plurality of orders with suitable tens carry circuits interposed as shown diagrammatically by the block diagram in Fig. 2. As will be noted hereinafter, it is unimportant how the orders of the register are arranged or coupled between orders insofar as the data transfer function is considered, since the data transfer pulses are entered in parallel in the respective orders and not serially. It is only necessary that the denominationally corresponding orders of the respective registers which are to receive the transferred value be cross coupled in the proper sense.

Associated with each triode tube V1 of the triggers comprising the stages ST1, ST2, ST4, ST8 for register A (Figs. 1A and 1C) are the multicollector transistors T2, T3 of which each emitter is connected to the cathode of the related tube V1 and the base grounded. As part of the means of correlating the combinational digital representation in the binary form of register A with the single element representation of register B, there are provided ten digital wires W4 which are associated with the respective digits noted in Figs. 1A and 1C by the scales comprising small numerals 0 to 9. There is a separate group of these digital wires W4 for each denominational order of which only the tens order is shown in Figs. 1A and 1C, for the purpose of converting the value from the binary combinational form to single representation or direct digital form. One of the wires W4 always will be maintained at a low potential to represent the particular digit retained in register A and represented by a combination of bit values.

In order to illustrate this in a simple way, let it be assumed that register A contains the value "1" which is represented by the fact that stage ST1 (Fig. 1A) is in "On" status with the right-hand triode of tube V1 conducting. Transistor T3 for this stage will be fully conductive with maximum current flow from the cathode to ground in the emitter-base circuit. There will be a maximum current flow in the wires W4 representing the digits "0," "2," "4," "6" and "8." Since transistor T2 is not conducting, the wire W4 representing "1" is held at a low potential so far as stage ST1 is concerned.

With reference to stage ST2, the transistor T2 is conducting a maximum since this stage is "Off," thus current will be flowing in wires W4 representing the digits "2," "3," "6," and "7." With reference to Fig. 1C, it will be noted that wire W4 representing "1" is connected to the collectors of transistors T3 for stages ST4, ST8 neither of which is in full conductive condition because these stages are in "Off" status with transistor T2 conductive neither of which are connected to the "1" wire W4. The wire W4 representing "9" is connected to the collector of the transistor T2 for stage ST8 so that current is flowing in this wire. Thus, of all of the wires W4 only the "1" wire is not carrying current by virtue of the fact that it is connected to the collector of the transistor T2 for stage ST1.

In Figs. 1B and 1D to 1F, it will be noted that the digital wires W4 are connected to the grids of tubes V3 and the grid input resistors R1 and the "1" wire W4 in particular is connected to the grid and resistor R1 associated with the right-hand tube V3 in Fig. 1B. Thus the current flow which exists in all the wires W4 except the "1" wire flows through all of the resistors R1 except the one at the right (Fig. 1B) which raises the grid potentials of all tubes V3 (except the right-hand one (Fig. 1B)) above cutoff and causes them to conduct.

The lowered anode potentials of the affected tubes V3 cut off all of the gates V4 at the suppressor grids, except the one at the right (Fig. 1B), corresponding to the "1" wire W4. The full grid bias is maintained on this tube preventing it from conducting. The high anode potential of right-hand triode V3 (Fig. 1B) primes the right-hand gate V4 for conduction; thus, of the ten gates V4 corresponding to the digits zero to 9 only the one associated with the digit "1" will be primed for conduction. In the drawings, the digit values of the gates V4 are indicated by the small numerals 0 to 9 above the related tubes V4.

It will be noted in Fig. 1B that the anode of the "1" gate V4 is connected to the anode of the right-hand triode V6 for stage ST1. Assuming that register B has been previously reset and stage ST0 is conductive on its right-hand side to designate "0," a positive transfer pulse appearing on wire W7 (Fig. 1B) will cause only the "1" gate V4 to conduct and this will have the same effect as the gate V5 on stage ST1 of register B as described above and will place the stage ST1 in "On" status thereby effecting the transfer of "1" from the register A, stage ST1 to the corresponding stage of register B. Stage ST0 will be shifted to "Off" status by circuit means described hereinafter.

A somewhat more complicated case may now be discussed in which it will be assumed that register A contains the value 7 represented by the stages ST1, ST2, ST4 being in "On" status. The wires W4 will be affected in the same respect as before insofar as the stage ST1 is concerned. It will be noted in Fig. 1A that the "7" wire W4 is not connected to any of the transistors T3 for stages ST1, ST2; therefore, this wire will not be conducting current so far as stages ST1, ST2 are concerned. Nor is a collector of the transistors T3 for stages ST2 and ST4 connected to the "7" wire. Transistor T2 for stage ST9 of register A, the only one in "Off" condition, is not connected to the 7 wire. It will be noted, however, that the remaining wires W4 are all connected to a collector for a transistor T3 for stages ST1, ST2, ST4 or transistor T2 for stage ST8. Thus all of the tubes V3, except the one at the extreme right (Fig. 1E) corresponding to "7," are rendered conductive and the associated gates V4, except the "7" gate, will not be primed for conduction. Since the tube V3 (Fig. 1E) corresponding to the "7" wire W4 is not conductive, its high anode potential will prime the "7" gate V4. Thus a transfer pulse appearing on wire W7 will cause the "7" gate V4 to conduct and shift stage ST7 of register B to "On" status.

It is quite clear that a value in an order of register A will be correctly transferred to register B even if it consists of a combination of the bit values 1, 2, 4, 8.

Since stages ST0 of register B are automatically reset to "On" status to represent "0" prior to effecting a transfer from register A to register B, it is necessary to shift them to "Off" status each time values are entered in the different orders by a transfer operation. This is the function of the gate V4A (Fig. 1B) which is controlled by the zero wire W4. When there is a value in register A and none in register B, tube V3 will be conductive, maintaining the zero gate V4 cut off and zero gate V4A will be primed for conduction in consequence of the high potential in the zero wire W4. The positive transfer pulse appearing on wire W7 will not affect gate V4 but will cause gate V4A to conduct and shift trigger V6 of stage ST0 to "Off" status. If there is no value in any order of register A, the related zero wire W4 will be at low potential rendering zero gate V4 conductive and gate V4A non-conductive. Gate V4 acts like the others to shift the zero trigger of stage ST0 to "On" status if it is not already in that condition.

The transfer of a value from register B to register A will now be described assuming the value 7 is contained in this register. This requires the ultimate shifting of the stages ST1, ST2, ST4 of register A to "On" status.

In this case stage ST7 (Fig. 1E) is in "On" status and the right-hand triode V6 of this stage is conductive. It will be noted that each right-hand triode of the tubes V6 for register B has one or more transistors T5 in the anode-cathode circuit, the base being grounded and the collectors being connected to the wires W6 which represent the different bit values as noted in the drawing by the scales of small numbers 1, 2, 4, 8 and the captions "Binary Values." In Figs. 1A and 1C, it will be noted that the wires W6 are connected to the grid input resistors R2 for the gate tubes V2. It is clear that current will flow in the three wires W6 corresponding to the bit values 1, 2, 4, priming the two gates tubes V2 in Fig. 1A and the one at the left in Fig. 1C at the control grids.

If a transfer pulse is applied to wire W5, it will appear on the suppressor grids of all of the tubes V2 except the one at the right in Fig. 1C, associated with the stage ST8, causing these tubes to conduct and, by drawing down the anode potentials of the right-hand triodes of tubes V1 for stages ST1, ST2, ST4, shifts these stages to "On" status. This action is assisted by the fact that the left-hand grids of the same tubes V1 will also be driven negative by a cumulative action and assist the trigger action in a well-known way. In this way the stages ST1, ST2, ST4 or register A will be shifted to "On" status to represent the value 7 in binary form.

The transfer pulses which appear on wires W5 and W7 are produced by a pair of pulse control and resetting circuits which are shown in detail in Fig. 1G and in block form in Fig. 2. The two circuits are identical and the corresponding tubes bear the subscript letters A and B which relates the circuit to the register which is to receive an entry and consequently must be reset.

It is assumed that there is provided a pair of timed pulse sources designated S1, S2, (Fig. 1G) which will be selectively made effective by control means not shown and not essential to an understanding of the present invention, to effect the transfer of data in the registers at the appropriate time in the operation of a data processing machine in which the invention is incorporated. Since the transfer pulse control circuits for the two registers are identical, only one will be described in detail and for this purpose it will be assumed that register B contains the value to be transferred to register A.

It should be explained at this point, that in general it is usually customary to provide means for resetting registers or storage devices in advance of the entry of data, thereby to make sure that any value to be entered or transferred will not be changed by the fact that one or more of the register stages still retains a value perhaps due to a failure of a circuit or to some transitory condition causing one of the triggers to go to "On" status. In the present case means are provided whereby a pulse from either source S1 or S2 causes both an automatic reset of the register which is to receive an entry and concurrently therewith tests the register to see if it actually was reset before a pulse is emitted to the transfer circuits over the wires W5 or W7 as the case may be.

Assuming register B contains a value, a timed pulse from source S1 turns trigger V8A (Fig. 1G) "On" and this will produce a positive pulse on the left-hand anode of tube V8A which is applied to the grid of tube V9A causing it to conduct. The latter is a cathode follower of which the cathode is connected to wire W3A which is the means of connecting the negative bias wire W2 to the grids of the left-hand triodes of the triggers V1 (Figs. 1A and 1C) through the cathode follower resistor R3A (Fig. 1G). The flow of current through the latter when tube V9A conducts causes the potential of wire W3A to rise above the potential of wire W2 sufficiently to cause the left-hand triodes of tubes V1 (Figs. 1A and 1C) to conduct and shift them to "Off" status.

The trigger circuit for the tube V8A is of the type frequently known as a one-shot multivibrator and it is normally in "Off" status as indicated by the small "x" beneath the cathode (Fig. 1G). With the left side normally conductive, the right-hand anode of tube V8A is at high potential but has no effect on the gate V10A because of the input condenser so that this gate remains nonconductive for the time being. After the trigger V8A has been switched to produce the resetting pulse on wire W3B, the trigger will remain in "On" status for a predetermined time which, however, is not critical and will be determined by the time constants of the trigger circuit, after which the trigger will automatically switch back to "Off" status and the potential of the right-hand anode of tube V8A will rise sharply. This will be communicated as a positive pulse to the suppressor grid of gate V10A causing it to conduct provided register A has actually been reset.

It will be noted that zero wire W4 in Fig. 1G leads from the grid of the tube V11A to a collector of each of the transistors T3 (Figs. 1A and 1C). If register A has actually been reset, transistors T3 will be conducting at minimum, little current will flow through zero wire W4 and the grid input resistor R4A of tube V11A, which is normally at cutoff, and the potential across the resistor R4A will be insufficient to cause this tube to conduct. The anode potential of tube V11A will remain high and prime gate V10A at the control grid for conduction when the positive pulse is produced on the suppressor grid by the trigger V8A. Gate V10A then conducts momentarily, producing a positive pulse on wire W5 which effects the transfer of data from register B to register A as described above.

When register A contains a residual value as, for instance, would be the case of stage ST1 (Fig. 1A) were "On," the transistor T3 for this stage will be conducting a maximum causing a rise in potential on the zero wire W4 and resistor R4A, causing tube V11A to conduct. This lowers the potential of the control grid of gate V10A below cutoff and prevents it from conducting when trigger V8A emits the positive pulse to the suppressor grid of gate V10A. This, of course, prevents the transfer pulse from being emitted over wire W5.

Trigger V8B operates in the same way in response to a timed pulse from source S2 to cause resetting of register B and to test register B for zero before the transfer pulse takes place. Tube V11B, like tube V11A, is normally at cutoff with its anode at high potential, priming gate V10B for conduction at the control grid.

When register B contains a significant value, stage ST0 will be conductive on the left-hand side, the transisstor T5 will be conducting a maximum and the potential on wire W13 will rise, tube V11B will conduct, and tube V10B will not be primed for conduction. Thus, a positive pulse applied to the suppressor grid of gate V10B from the trigger V8B will not cause tube V10B to conduct.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an electronic data processing machine, a pair of registers, one of said registers having each order comprised of a series of bistable trigger stages representing by a predetermined stable state the component values of a non-decimal number system, the other register having each order composed of a ring circuit including a series of bistable trigger stages representing all of the digits of the decimal system, each digit being represented by a predetermined stable state of a certain trigger stage; a series of digit wires associated with the first series of stages, a series of digit switch tubes, each having a pulse output connected to one of said decimal trigger stages for placing said trigger in the digit representing state, a transfer pulse input, and a control input for rendering the switch tube operative to emit an output pulse under control of the transfer pulse, means controlled by said digit wires and connected to the control inputs for rendering the switch tubes electively effective digitally, means to couple said first series of stages to said digit wires complementarily on a component value basis to render a predetermined one of said digit wires effective according to the value registered in said first series of stages, and means to apply a transfer pulse to said transfer pulse inputs.

2. In an electronic data processing machine, a pair of registers, one of said registers having each order composed of a series of bistable trigger stages separately representing, each by a predetermined stable state, all of the different digits of the decimal system, the other of said registers having each order composed of a series of component value stages different in number of stages from said first register and capable of representing values stored by a single stage in said first register by a plurality of component value stages; a series of wires representing all of said component values, each wire being common to all of the digit stages of said first register which require the represented component value to wholly or partly represent said digits in said second register, means coupling the component value wires to the stages of said first register according to the component values in the digits represented by said first register; a series of switch tubes, one for each component value stage of said second register, said switch tubes having a transfer pulse output, a control pulse input connected to the related component value wires, and a pulse output connected to the corresponding component value stage of said second register for changing said stage to component value representing state; and means to apply a transfer pulse to all of said switch tubes.

3. In an electronic data processing machine, two registers, one having its orders capable of receiving values by a decimal digit representation and the other having its orders capable of receiving values by a combination of component value representations, said registers having trigger stages which by a predetermined one of two stable states represent the decimal digits and component values respectively, a series of component value representing circuits, means to couple said circuits to the trigger stages of the first register so that each component value circuit is controlled by the triggers for those digits which are wholly or partly represented in the second register by the component value corresponding to said circuit; a series of component value switch tubes, each having a control input connected to the component value circuit corresponding to the same component value, a transfer pulse input, and an output connected to the corresponding component value triggers for placing said triggers in component value representing state, and means for applying a transfer pulse to said transfer pulse inputs.

4. In a data processing machine, a decimal binary register comprising a plurality of orders, each order having a series of elements settable to represent the component values 1, 2, 4, 8; a decimal register having a plurality of orders, each order having a series of elements, each settable to represent one of the digits 0 to 9, a plurality of normally ineffective separate setting means, each representing a digit and common to all of the first settable elements which must be set to represent the binary equivalent of said digit and, when rendered operative setting the second settable means corresponding to such digit; means for coupling said first settable means to said setting means to select said setting means digitally according to the digits represented by the settable means, and means for rendering the selected setting means operative in the different orders to effect a transfer from the binary register to the decimal register.

5. In a data processing machine, a decimal register, each order having a series of digit elements separately representing the digits 0 to 9; a second register each order having a series of four elements for representing the binary component values 1, 2, 4, 8; two separate transfer means for intercoupling the component value elements and digit elements, one being operable to couple each of the binary elements to all the digit elements which are wholly or partly represented by the component value element represented by such binary element, and the other being operable to couple each digit element to all of the binary elements which singly or in combination represent such digit; and means selectable to render the coupling means effective at will.

6. In an electronic data processing machine, a binary register in which each order comprises a series of bistable binary trigger circuits, each settable to a predetermined one of said states to represent one of the values 1, 2, 4, 8; a decimal register in which each order comprises a separate series of decimal triggers, each settable to represent one of the digits 0 to 9; a series of digit wires; a series of multicollector transistors having emitters controlled by the stable states of the binary trigger circuits and the collectors connected to said digit wires so as to select a particular digit wire when the binary triggers are set to represent such digit, a series of digital switching tubes having inputs connected to said wires, pulse outputs connected to said digital triggers, and transfer pulse inputs; and means for applying a transfer pulse to said pulse inputs to render said switch tubes effective to pulse the digit triggers corresponding to the binary triggers set to represent the respective digits in a number represented by the binary register.

7. In an electronic data processing machine, a decimal register comprising a plurality of orders, each order having a series of bistable digit triggers each settable to a predetermined one of two stable states to represent one of the digits 0 to 9; a binary register comprising a plurality of orders, each order having a series of bistable triggers, each settable in a predetermined one of two stable states to represent one of the binary component values 1, 2, 4, 8; a series of binary wires each representing one of said component values; a series of transistors having emitters controlled by the predetermined state of one of said digit triggers and having collectors connected to those binary wires corresponding to the different component values required to represent such digit in the binary system, switch means for separately coupling said wires to the binary triggers according to the binary representations of the binary triggers, and means to render the switch means effective in all of the orders to effect a transfer of a number represented by the digit triggers by setting the corresponding binary triggers to the predetermined stable state.

8. In an electronic data processing machine, a register having a series of bistable trigger circuits, each designating one of the binary component values 1, 2, 4, 8 when set in one of its two stable states; a register having a series of bistable trigger circuits, each representing one of the digits 0 to 9, one trigger circuit for each digit, when set in one of its two stable states, a series of digit circuits representing the digits 0 to 9, each having switch means for setting the corresponding trigger circuit of said second register to represent a digit, a series of semiconductor translating devices for coupling said first named trigger circuits to said digit circuits, each of said semiconductor devices having an emitter responsive to one of the stable states of one of the first named trigger circuits and having a plurality of collectors connected to different digit circuits in such fashion that all such digit circuits except the one corresponding in value to the binary values represented by one or more of said first named trigger circuits being set in the designating stable state are held at one potential and said one digit circuit being held at a different potential to condition the associated switch for effective operation, and means to render the conditioned switch effective.

9. In an electronic data processing machine, a register having a series of bistable trigger circuits, each designating one of the binary component values 1, 2, 4, 8 when set in one of its two stable states; a register having a series of bistable trigger circuits, each representing one of the digits 0 to 9 when set in one of its two stable states; a series of component value circuits representing the binary values 1, 2, 4, 8, each circuit including a switch conditionable to set the correspondingly valued trigger circuit of the first named register in designating state, a series of semiconductors for coupling the trigger circuits of the second register to said component value circuits according to the combinations of the component values 1, 2, 4, 8 required to represent the digit in the binary system, and means for rendering all of the conditioned switches effective to cause the first register to be set to represent in the binary system the digit represented by the second register.

10. In a data processing machine, two registers, one for designating numbers in the binary system and the other for designating numbers in the decimal system, means for cross coupling the registers for transfer of a binary designation from the first register to the second register, means for transferring a decimal designation from the decimal register to the binary register, and selectable means for rendering on or the other of the transferring means effective.

11. In a data processing machine, a pair of registers, one for designating values in the binary system, the other for designating values in the decimal system, means for cross coupling the registers for a bilateral transfer of values from one register to the other, means to test the register receiving the transferred value for zero, and means responsive to the test means for clearing the receiving register when it is not clear.

12. In an electronic data processing machine a pair of electronic registers, one representing values in the binary system and the other in the decimal system, bilateral cross coupling circuits for transferring values between said registers, each circuit including switching means for setting the registers to designate values and semiconductor translating devices for selectively conditioning the switching means for a transfer of values, and means for rendering the conditioned switching means effective.

13. In an electronic data processing machine, a binary register, each order having a series of bistable trigger circuits, each representing by one of its stable states, one of the binary values 1, 2, 4, 8, a series of digit output circuits for each order each having a switch partly activated by a change in potential representing a digit induced on such output circuit; a plurality of semiconductor translating devices, each device having an emitter for inducing conduction of such device in response to one of the stable states of one of said trigger circuits, and a plurality of collector circuits connected to said output circuits to selectively effect potential changes and selectively partly activate the switches in the output circuits representative of the digit equivalent of the binary values represented by said trigger circuits; and means to complete the activation of said switches and effect a value transfer in decimal form of the binary value retained in said register.

14. In an electronic data processing machine, a binary register comprising a plurality of orders, each order having 1, 2, 4, 8 bistable trigger stages, a plurality of series of digit output wires, one series for each order and representing the digits 0 to 9, a plurality of series of digit output devices one series for each series of wires, each output device being made operative by a predetermined change of potential induced on the associated wire; and a plurality of series of transistors, one series for each series of wires, said transistors having emitters connected to said trigger circuits for rendering said transistors selectively conductive and nonconductive in response to changes in stable state of said trigger circuits, and having collectors connected to said digit output circuits for selectively inducing the predetermined voltage changes according to the values represented by said trigger circuits.

15. In an electronic data processing machine, a decimal register, each order having a series of bistable trigger circuits, each circuit in a series representing one of the digits 0 to 9, a series of binary value output circuits for each order, each output circuit having a switch partly activated by a potential change induced on such output circuit, a plurality of semiconductor translating devices, each device having an emitter connected to one of said trigger circuits and inducing conduction of said device when the associated trigger circuit is in digit representing state, said devices having collectors connected to said output circuits for inducing a potential change in one or more of said output circuits to correspond with the binary component values required to represent each digit; and circuit means for completing the activation of all of said switches to effect a binary value output corresponding to the decimal representation of said register.

16. In an electronic data processing machine, a decimal register comprising a plurality of orders, each order having a series of bistable trigger circuits representing the digits 0 to 9; a plurality of series of component value circuits one series for each series of trigger circuits and including output devices representing component values and selectively responsive to predetermined potential changes selectively induced in said output circuits; and a plurality of series of transistors, one series for each series of output circuits, said transistors having emitters connected to said trigger circuits for rendering said transistors selectively conductive and non-conductive in response to changes in state of said trigger circuits and having collectors connected to said digit output circuits for selectively inducing the predetermined voltage changes according to the values represented by said trigger circuits.

References Cited in the file of this patent

UNITED STATES PATENTS

| | | |
|---|---|---|
| 2,519,184 | Grosdoff | Aug. 15, 1950 |
| 2,570,716 | Rochester | Oct. 9, 1951 |
| 2,576,099 | Bray et al. | Nov. 27, 1951 |
| 2,633,498 | Schneckloth | Mar. 31, 1953 |
| 2,658,166 | Depp | Nov. 3, 1953 |
| 2,693,593 | Crossman | Nov. 2, 1954 |
| 2,697,549 | Hobbs | Dec. 21, 1954 |
| 2,734,182 | Rajchman | Feb. 7, 1956 |
| 2,761,620 | Lindesmith et al. | Sept. 4, 1956 |
| 2,838,745 | Wright | June 10, 1958 |